(12) United States Patent
Karasudani et al.

(10) Patent No.: US 10,930,068 B2
(45) Date of Patent: Feb. 23, 2021

(54) ESTIMATION APPARATUS, ESTIMATION METHOD, AND NON-TRANSITORY COMPUTER-READABLE STORAGE MEDIUM FOR STORING ESTIMATION PROGRAM

(71) Applicant: FUJITSU LIMITED, Kawasaki (JP)

(72) Inventors: Ayu Karasudani, Yamato (JP); Tomohiro Aoyagi, Toshima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/194,658

(22) Filed: Nov. 19, 2018

(65) Prior Publication Data
US 2019/0180503 A1    Jun. 13, 2019

(30) Foreign Application Priority Data
Dec. 12, 2017    (JP) .............................. JP2017-238051

(51) Int. Cl.
*G06T 7/73* (2017.01)
*G06T 7/62* (2017.01)
(Continued)

(52) U.S. Cl.
CPC ................ *G06T 17/20* (2013.01); *G06T 7/62* (2017.01); *G06T 7/73* (2017.01); *G06T 7/75* (2017.01);
(Continued)

(58) Field of Classification Search
CPC .... G06T 7/62; G06T 7/73; G06T 7/75; G06T 11/203; G06T 19/20; G06T 2207/30244
See application file for complete search history.

(56) References Cited

U.S. PATENT DOCUMENTS

2012/0051645 A1*  3/2012  Sun ..................... G06K 9/00402
                                                       382/190
2012/0269388 A1*  10/2012  Jiang ..................... G01C 11/00
                                                       382/103
(Continued)

FOREIGN PATENT DOCUMENTS

| JP | 2017-91078 | 5/2017 |
| JP | 2017-182302 | 10/2017 |
| WO | 2012/173141 | 12/2012 |

OTHER PUBLICATIONS

H. H. Chen, "Pose Determination from Line-to-Plane Correspondences: Existence Condition and Closed-form Solutions", IEEE Transactions on Pattern Analysis and Machine Intelligence, vol. 13, No. 6, pp. 530-541, 1991 (12 pages).
(Continued)

*Primary Examiner* — Grace Q Li
(74) *Attorney, Agent, or Firm* — Fujitsu Patent Center

(57) ABSTRACT

An estimation apparatus is configured to obtain shape information containing information about multiple line segments that depict a shape of an object; detect multiple feature lines in an image of the object captured by an imaging apparatus; receive a first instruction for associating a feature line selected from the multiple feature lines with a line segment selected from the multiple line segments and a second instruction for associating two points selected in the image with two end points selected from end points of the multiple line segments; generate a first line segment connecting the two points and a second line segment connecting the two end points; and estimate a position and orientation of the imaging apparatus in three-dimensional space by using a combination of the selected feature line and the selected line segment and a combination of the first line segment and the second line segment.

15 Claims, 13 Drawing Sheets

(51) Int. Cl.
*G06T 19/20* (2011.01)
*G06T 11/20* (2006.01)
*G06T 17/20* (2006.01)

(52) U.S. Cl.
CPC ............ *G06T 11/203* (2013.01); *G06T 19/20* (2013.01); *G06T 2207/30244* (2013.01)

(56) References Cited

U.S. PATENT DOCUMENTS

| | | |
|---|---|---|
| 2014/0098091 A1 | 4/2014 | Hori |
| 2014/0176530 A1* | 6/2014 | Pathre ................... G06T 19/20 345/419 |
| 2015/0016723 A1* | 1/2015 | Francini ............... G06K 9/6212 382/170 |
| 2017/0132752 A1 | 5/2017 | Aoyanagi et al. |
| 2017/0287154 A1 | 10/2017 | Yamaguchi |

OTHER PUBLICATIONS

J. Z. C. Lai, "Sensitivity Analysis of Line Correspondence", IEEE Transactions on Systems, Man, and Cybernetics, vol. 25, No. 6, pp. 1016-1023, 1995 (8 pages).

\* cited by examiner

ESTIMATION APPARATUS, ESTIMATION METHOD, AND NON-TRANSITORY COMPUTER-READABLE STORAGE MEDIUM FOR STORING ESTIMATION PROGRAM

CROSS-REFERENCE TO RELATED APPLICATION

This application is based upon and claims the benefit of priority of the prior Japanese Patent Application No. 2017-238051, filed on Dec. 12, 2017, the entire contents of which are incorporated herein by reference.

FIELD

The embodiment discussed herein is related to an estimation apparatus, an estimation method, and a non-transitory computer-readable storage medium for storing an estimation program.

BACKGROUND

In recent years, a system for displaying images by using an augmented reality (AR) technology has been widespread. In an example of the AR technology, the position and orientation of a camera in three-dimensional (3D) space is estimated in accordance with an image of an object that is captured by using a camera included in a personal computer (PC), a mobile terminal device, or the like; and content information is displayed in a superimposed manner onto the image at an arbitrary position based on the determined position and orientation of the camera.

As an application of the AR technology, a technology for displaying in a superimposed manner computer-aided design (CAD) data content that presents the 3D shape of an object onto an image is also known. Another known technology is for determining the position and orientation of an object with reference to line-to-plane correspondences or line correspondences.

Examples of the related art include International Publication Pamphlet No. WO 2012-173141 (patent literature 1), Japanese Laid-open Patent Publication No. 2017-91078 (patent literature 2), Japanese Laid-open Patent Publication No. 2017-182302 (patent literature 3), H. H. Chen, "Pose Determination from Line-to-Plane Correspondences: Existence Condition and Close-form Solutions", IEEE Transactions on Pattern Analysis and Machine Intelligence VOL. 13, NO. 6, pages 530-541, 1991 (non-patent literature 1), and J. Z. C. Lai, "Sensitivity Analysis of Line Correspondence", IEEE Transactions on Systems, Man, and Cybernetics VOL. 25, NO. 6, pages 1016-1023, 1995 (non-patent literature 2).

SUMMARY

According to an aspect of the embodiments, an estimation apparatus includes: a memory configured to store shape information containing information about multiple line segments that depict a shape of an object; and a processor coupled to the memory and configured to execute detection processing that includes detecting multiple feature lines in an image of the object captured by an imaging apparatus, execute reception processing that includes receiving a first instruction for associating a feature line selected from the multiple feature lines with a line segment selected from the multiple line segments and a second instruction for associating two points selected in the image with two end points selected from end points of the multiple line segments, execute generation processing that includes generating a first line segment connecting the two points and a second line segment connecting the two end points, and execute estimation processing that includes estimating a position and orientation of the imaging apparatus in three-dimensional space by using a combination of the selected feature line and the selected line segment and a combination of the first line segment and the second line segment.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
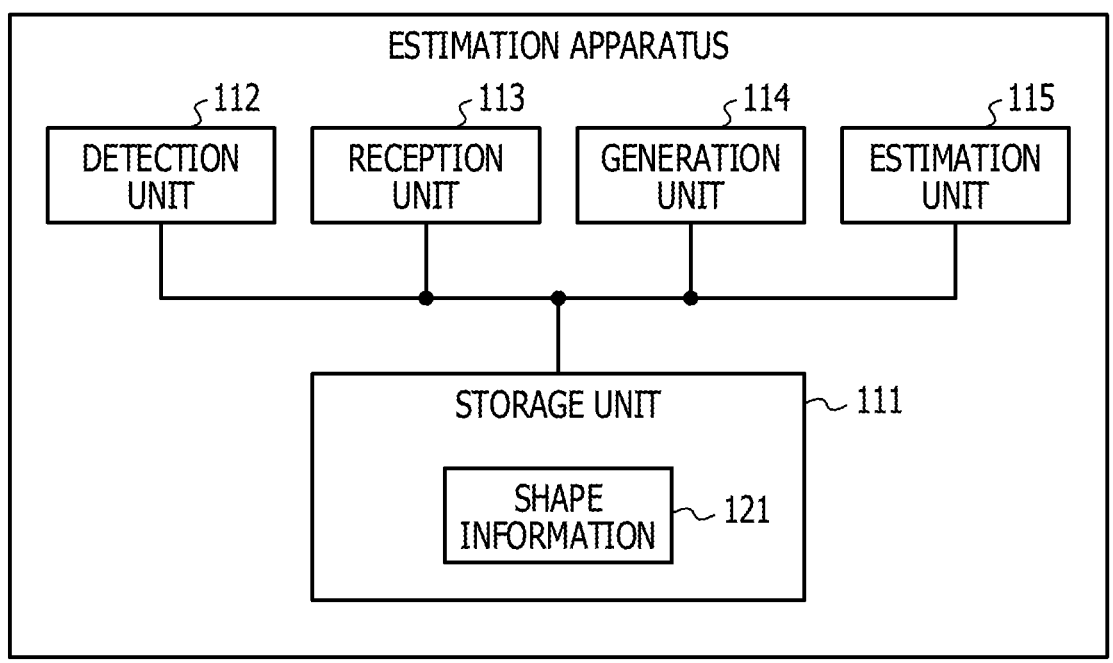
FIG. 1 illustrates a functional configuration of an estimation apparatus.

By associating multiple feature lines detected in an image of an object with multiple line segments contained in CAD data of the object, it is possible to estimate the position and orientation of an imaging apparatus. Nevertheless, if a user visually and manually selects a combination of a feature line and a line segment, it is difficult to select an appropriate combination. As a result, it takes time for the user to perform the operation, and an incorrect combination of a feature line and a line segment may be selected.

Such a problem arises not only in a case where the position and orientation of an imaging apparatus is estimated in accordance with CAD data, but also in a case where the position and orientation of an imaging apparatus is estimated in accordance with other kinds of shape information that indicates the shape of an object.

In one aspect, an object of an embodiment is to estimate, with a simple operation, the position and orientation of an imaging apparatus by using an image of an object captured by the imaging apparatus and shape information about the object.

The embodiment is described in detail below with reference to the drawings. In the technology of patent literature 1, by associating three or more points in a captured image of an object targeted for measurement with three or more points in a 3D object denoted by CAD data of the object targeted for measurement, the image and the 3D object are displayed in a superimposed manner. However, it is difficult to select points in an image and a 3D object by using a mouse or the like and thus the user's workload increases.

In the technology of patent literature 2, by using combinations of edge lines extracted from a captured image of a 3D structure and ridge lines contained in a model image of the 3D structure, the captured image and the model image are displayed in a superimposed manner.

In this case, a user selects line segments such as an edge line and a ridge line, which are noticeably more visible than points. Consequently, selecting an edge line and a ridge line by using a mouse or the like is easier than selecting points, and as a result, the user's workload decreases. However, patent literature 2 does not mention a method for selecting an appropriate combination of an edge line and a ridge line.

In the technology of patent literature 3, the position and orientation of a camera is calculated by using combinations (initial corresponding pairs) of multiple projection lines obtained by projecting onto a captured image of an object multiple candidate lines contained in the CAD data of the object and multiple feature lines detected in the image. Subsequently, other candidate lines are projected onto the image by using the calculated position and orientation of the camera and another combination of a projection line and a feature line is automatically added. By using the added combination of a projection line and a feature line, the position and orientation of the camera is calculated again.

In this case, since a combination of a projection line and a feature line is automatically added, the user's workload for selecting a projection line and a feature line decreases. However, patent literature 3 does not mention a method for easily selecting initial corresponding pairs.

As disclosed in patent literature 2 and 3, if a user visually and manually selects a combination of a feature line detected in an image of an object and a line segment contained in the CAD data of the object, the following problem presumably occurs.

If the user is inexperienced, it is difficult for the user to rotate a model of an object so as to set the model in an appropriate orientation on a screen on which an image of the object and the model of the object denoted by CAD data and to select an appropriate combination of a feature line and a line segment. For example, to improve the accuracy of estimating the position and orientation of a camera, selected feature lines or selected line segments preferably do not include three parallel feature lines or three parallel line segments. Therefore, it may take time to select an appropriate combination of a feature line and an incorrect combination of a feature line and a line segment may be selected.

Instead of a user selecting initial corresponding pairs, another method has been considered for randomly selecting combinations of multiple projection lines and multiple feature lines, estimating the position and orientation of a camera, and determining a combination with which the estimation error is the smallest. Nevertheless, in this case, while changing combinations of projection lines and feature lines, estimating the position and orientation of a camera is repeated, and as a result, the calculation takes longer to complete.

FIG. 1 illustrates an example of a functional configuration of an estimation apparatus of the embodiment. An estimation apparatus 101 in FIG. 1 includes a storage unit 111, a detection unit 112, a reception unit 113, a generation unit 114, and an estimation unit 115. The storage unit 111 stores shape information 121 containing information about multiple line segments that depict the shape of an object. The detection unit 112, the reception unit 113, the generation unit 114, and the estimation unit 115 perform estimation processing by using the shape information 121 stored in the storage unit 111.

Figure 2:
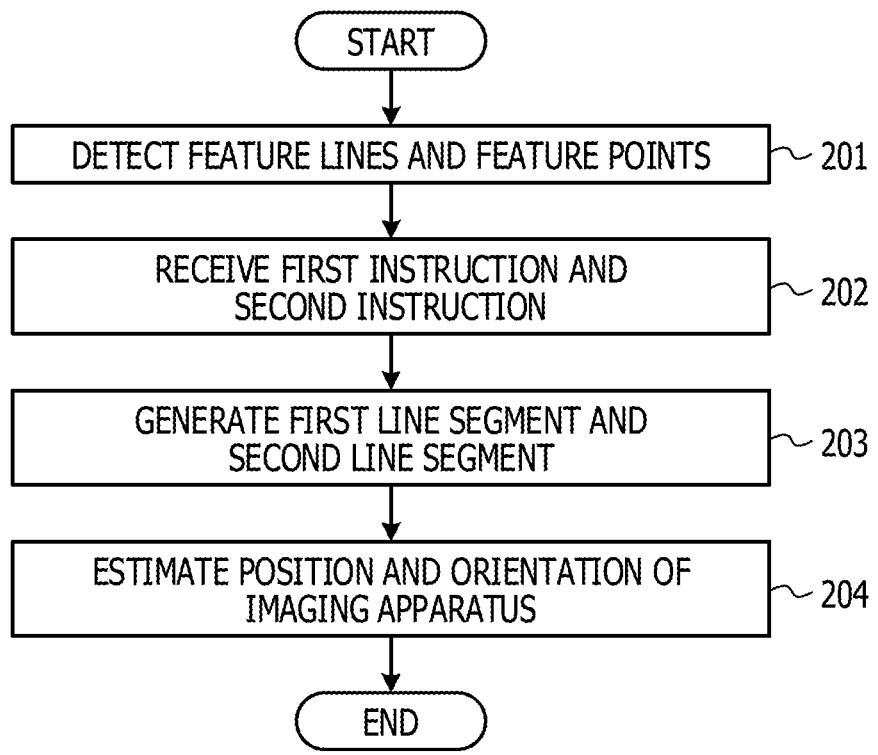
FIG. 2 is a flowchart illustrating an estimation processing.

FIG. 2 is a flowchart illustrating an example of the estimation processing performed by the estimation apparatus 101 in FIG. 1. The detection unit 112 detects multiple feature lines and multiple points in an image of an object captured by an imaging apparatus (step 201), and the reception unit 113 receives a first instruction and a second instruction (step 202). The first instruction associates a feature line selected from the multiple feature lines with a line segment selected from multiple line segments whose information is contained in shape information. The second instruction associates two points selected in the image of the object with two end points selected from end points of the multiple line segments whose information is contained in the shape information.

The generation unit 114 generates a first line segment that connects the two points processed under the second instruction to each other and a second line segment that connects the two end points processed under the second instruction to each other (step 203). The estimation unit 115 estimates the position and orientation of the imaging apparatus in three-dimensional space by using a combination of a selected feature line and a selected line segment and a combination of the first line segment and the second line segment (step 204).

The estimation apparatus 101 is able to estimate, with a simple operation, the position and orientation of an imaging apparatus by using an image of an object captured by the imaging apparatus and shape information about the object.

Figure 3:
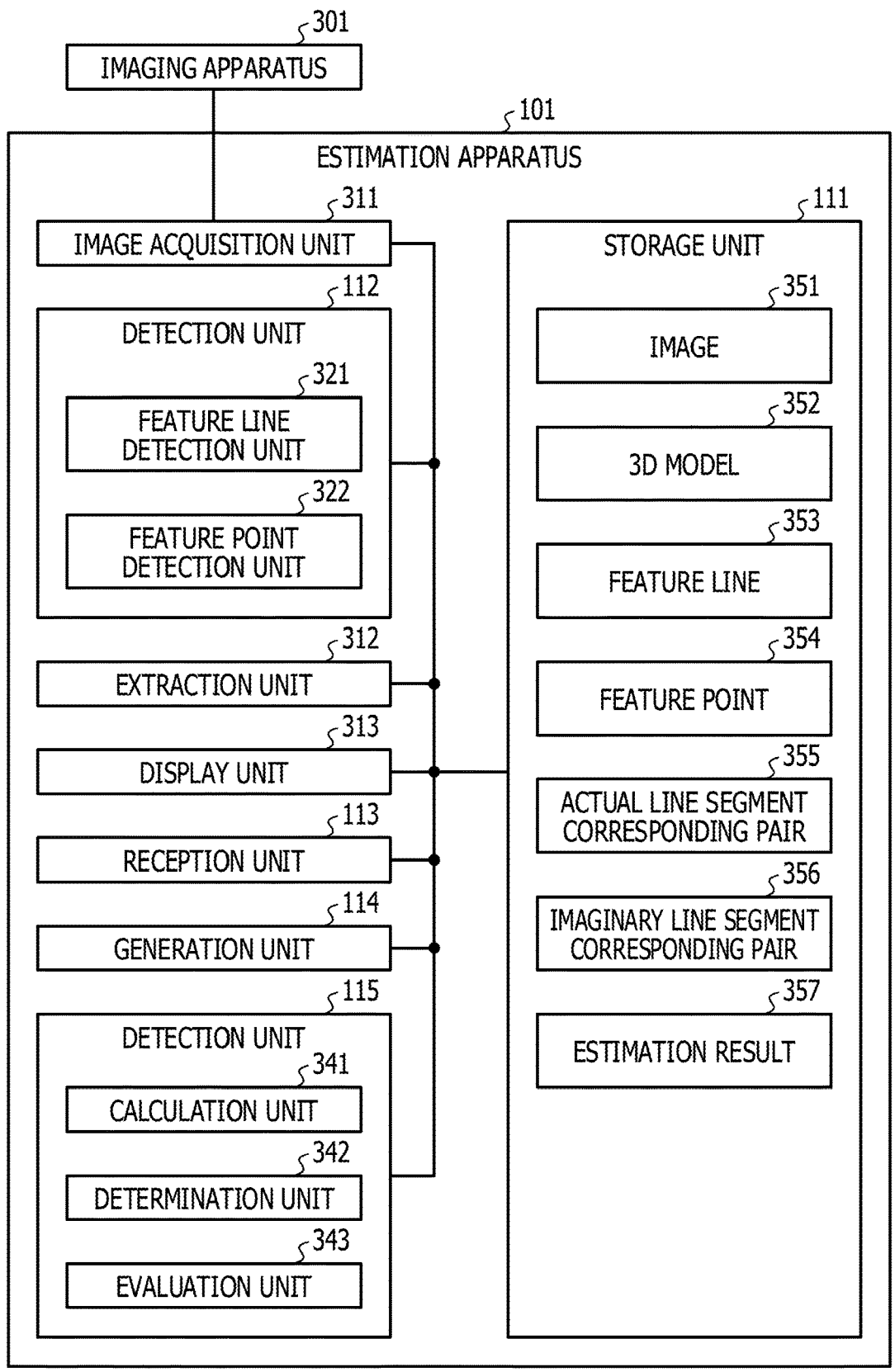
FIG. 3 illustrates a specific example of a functional configuration of the estimation apparatus.

FIG. 3 illustrates a specific example of the estimation apparatus 101 in FIG. 1. The estimation apparatus 101 in FIG. 3 includes the storage unit 111, the detection unit 112, the reception unit 113, the generation unit 114, the estimation unit 115, an image acquisition unit 311, an extraction unit 312, and a display unit 313. The detection unit 112 includes a feature line detection unit 321 and a feature point detection unit 322, and the estimation unit 115 includes a calculation unit 341, a determination unit 342, and an evaluation unit 343.

The estimation apparatus 101 may be a mobile terminal device, such as a tablet computer, a notebook computer, or a smart device, or may be an information processing device, such as a desktop computer.

An imaging apparatus 301 is, for example, a camera that has an imaging element, such as a charged-coupled device (CCD) or a complementary metal-oxide-semiconductor (CMOS), and that captures an image 351 of an object. The image acquisition unit 311 acquires the image 351 from the imaging apparatus 301 and stores the image 351 in the storage unit 111.

The storage unit 111 stores a 3D model 352 indicating the shape of an object whose image is captured by the imaging apparatus 301. The 3D model 352 corresponds to the shape information 121 in FIG. 1 and is, for example, CAD data of an object. The 3D model 352 includes vertex information about multiple vertexes that define the three-dimensional shape of an object and line segment information about multiple line segments. The vertex information includes three-dimensional coordinates of vertexes of an object, and the line segment information includes discrimination information indicating end points at both ends of the respective line segments.

The feature line detection unit 321 performs edge detection processing for the image 351, detects multiple edge lines in the image 351, and stores the detected edge lines as feature lines 353 in the storage unit 111.

The feature point detection unit 322 performs feature point detection processing for the image 351, detects multiple feature points 354 in the image 351, and stores the detected feature points 354 in the storage unit 111. The feature point detection unit 322 is able to detect a feature point in the image 351 in accordance with, for example, the grayscale level because the grayscale level largely varies in the surrounding area of the focus point in the image 351 and the position of a focus point is uniquely specified in the image 351 in accordance with the grayscale level.

The extraction unit 312 extracts from the 3D model 352 the line segment information about multiple line segments depicting the three-dimensional shape of the object. The display unit 313 displays the image 351 on a screen and displays the multiple feature lines 353 and the multiple feature points 354 on the displayed image 351 in a superimposed manner. The display unit 313 also displays as the 3D model 352 the multiple line segments that are indicated by the line segment information extracted by the extraction unit 312 on the screen.

Displaying the multiple feature lines 353 and the multiple feature points 354 on the image 351 in a superimposed manner facilitates the operation for selecting the feature line 353 and the feature point 354. Displaying the multiple line segments as the 3D model 352 facilitates the operation for selecting a line segment.

A user selects one or more feature lines 353 from the multiple feature lines 353 displayed on the image 351 in a superimposed manner and one or more line segments from the multiple line segments displayed as the 3D model 352. Subsequently, the user inputs into the estimation apparatus 101 an instruction for associating the selected feature line 353 in the image 351 with the respective selected line segment in the 3D model 352, and the reception unit 113 receives the instruction. The generation unit 114 generates combinations (corresponding pairs) in which the feature lines 353 are associated with the respective line segments selected by the user and stores in the storage unit 111 the generated corresponding pairs as actual line segment corresponding pairs 355.

Furthermore, the user selects two or more points from multiple points selectable in the image 351 and two or more end points from end points of the multiple line segment displayed as the 3D model 352. The multiple points selectable in the image 351 include the multiple feature points 354 displayed on the image 351 in a superimposed manner and a point other than the feature points 354 that is visually recognizable as a vertex of the object by the user. The user then inputs into the estimation apparatus 101 an instruction for associating the points selected in the image 351 with the respective end points selected in the 3D model 352, and the reception unit 113 receives the instruction.

The generation unit 114 generates an imaginary line segment VL1 that connects two points selected in the image 351 by the user and an imaginary line segment VL2 that connects two end points selected in the 3D model 352 by the user. Subsequently, the generation unit 114 generates a corresponding pair in which the imaginary line segment VL1 is associated with the imaginary line segment VL2 and stores in the storage unit 111 the generated corresponding pair as an imaginary line segment corresponding pair 356.

For example, the user is able to select a point in the image 351 and an end point included in the 3D model 352 by performing the following selection operation.

(1) Selection Operation with Specifying Imaginary Line Segment

The user explicitly designates a point at each end of the imaginary line segment VL1 and an end point at each end of the imaginary line segment VL2 for each of one or more corresponding pairs and inputs into the estimation apparatus 101 an instruction for associating the designated points in the image 351 with the respective designated end points included in the 3D model 352.

The generation unit 114 generates the imaginary line segment VL1 that connects the two designated points in the image 351 and the imaginary line segment VL2 that connects the two designated end points in the 3D model 352. In such a manner, one or more corresponding pairs, in which the imaginary line segment VL1 is associated with the imaginary line segment VL2 are generated.

When a line segment corresponding to the imaginary line segment VL2 is included in the 3D model 352, it is possible for the user to designate an end point on each end of the imaginary line segment VL2 by designating the line segment.

(2) Selection Operation without Specifying Imaginary Line Segment

The user selects M points (M is an integer equal to or more than two) in the image 351 and M end points included in the 3D model 352 and inputs in the estimation apparatus 101 an instruction for associating the selected points in the image 351 with the respective selected end points included in the 3D model 352.

The generation unit 114 generates M(M−1)/2 kinds of combinations of two respective points among the M points in the image 351 and generates the imaginary line segments VL1 that each connect two points included in the respective combinations. The generation unit 114 also generates M(M−1)/2 kinds of combinations of respective two end points among the M end points included in the 3D model 352 and generates the imaginary line segments VL2 that each connect two end points included in the respective combinations. In such a manner, M(M−1)/2 kinds of corresponding pairs in each of which the imaginary line segment VL1 is associated with the imaginary line segment VL2 are generated.

In this case, it is not desirable that the user explicitly designate both ends of an imaginary line segment, and as a result, the operation load decreases compared with the selection operation with specifying an imaginary line segment.

After the imaginary line segment corresponding pair 356 is generated, the determination unit 342 determines whether it is possible to accurately estimate the position and orientation of the imaging apparatus 301 in accordance with the generated actual line segment corresponding pair 355 and the generated imaginary line segment corresponding pair 356. To calculate the position and orientation of the imaging apparatus 301, it is preferable to use at least four corresponding pairs, and as the number of corresponding pairs increases, the accuracy of calculation improves. Accordingly, the determination unit 342 may determine that it is possible to accurately estimate the position and orientation of the imaging apparatus 301 when the total number of corresponding pairs including the actual line segment corresponding pair 355 and the imaginary line segment corresponding pair 356 is four or more.

The determination unit 342 may, by using the technology in non-patent literature 1 or the technology in non-patent literature 2, determine whether it is possible to accurately estimate the position and orientation of the imaging apparatus 301. The technology in non-patent literature 1 estimates the position and orientation of a camera in accordance with a combination of three line segments in an image and three line segments in a 3D model. The technology in non-patent literature 1 also determines whether it is possible to estimate the position and orientation of the camera in accordance with a positional relationship of line segments that are used. In a case where the position and orientation of the camera are not determined in accordance with any combination of three line segments in the image and three line segments in the 3D model, it is determined that estimating the position and orientation of the camera is not possible.

The technology in non-patent literature 2 evaluates the accuracy of estimating the position and orientation of a camera by using a positional relationship between a line segment in an image and a line segment in a 3D model and an approximate position and orientation of the camera.

When it is possible to accurately estimate the position and orientation of the imaging apparatus 301, the calculation unit 341 calculates the position and orientation of the imaging apparatus 301 in three-dimensional space by using the actual line segment corresponding pair 355 and the imaginary line segment corresponding pair 356. The calculation unit 341 stores in the storage unit 111 information on the calculated position and orientation as an estimation result 357. For example, the calculation unit 341 is able to calculate the position and orientation of the imaging apparatus 301 by employing the calculation method described in patent literature 3.

The evaluation unit 343 calculates an estimation error of the position and orientation of the imaging apparatus 301 indicated by the estimation result 357 and outputs information for requesting an additional instruction in accordance with the estimation error. For example, the evaluation unit 343 is capable of calculating the estimation error by employing the calculation method described in patent literature 3. In a case where the estimation error is equal to or more than a predetermined value, the evaluation unit 343 outputs information for requesting an additional instruction. The information for requesting an additional instruction may be a mark or a text message displayed on the screen or an audio message.

In this case, the user selects one or more additional points from multiple points selectable in the image 351 and one or more additional end points from end points of the multiple line segments displayed as the 3D model 352. The user subsequently inputs in the estimation apparatus 101 an instruction for associating the selected additional points with the respective selected additional end points, and the reception unit 113 receives the instruction.

The generation unit 114 selects two points including an additional point from the points and the additional points that have been selected in the image 351 by the user and generates an imaginary line segment VL3 that connects the two points. The generation unit 114 also selects two end points including an additional end point from the end points and the additional end points that have been selected in the 3D model 352 by the user and generates an imaginary line segment VL4 that connects the two end points. Subsequently, the generation unit 114 generates a corresponding pair in which the imaginary line segment VL3 is associated with the imaginary line segment VL4 and adds the generated corresponding pair to the imaginary line segment corresponding pair 356.

The calculation unit 341 calculates again the position and orientation of the imaging apparatus 301 by using the actual line segment corresponding pair 355 and the imaginary line segment corresponding pair 356 to which the corresponding pair has been added and updates the estimation result 357 in accordance with the calculated position and orientation.

By using the estimation apparatus 101 in FIG. 3, it is desirable that the user select only one corresponding pair of the feature line 353 in the image 351 and a line segment in the 3D model 352. Furthermore, it is easy to select as a point in the image 351 the feature point 354 displayed on the image 351 in a superimposed manner, and a vertex of an object that is not detected as the feature point 354 is selectable by using as a clue the feature line 353 displayed on the image 351 in a superimposed manner. Moreover, it is easy to select an end point included in the 3D model 352.

This facilitates the selection operation for designating multiple appropriate corresponding pairs, and thus, even if the user is inexperienced, an operating time may decrease and the possibility that an incorrect combination is selected may also decrease. Further, since multiple appropriate corresponding pairs are automatically generated, it is not desirable to repeat processing for estimating the position and orientation of the imaging apparatus 301 while changing multiple corresponding pairs that are randomly selected, and as a result, a significant increase in calculation time may be avoided.

Figure 4A:
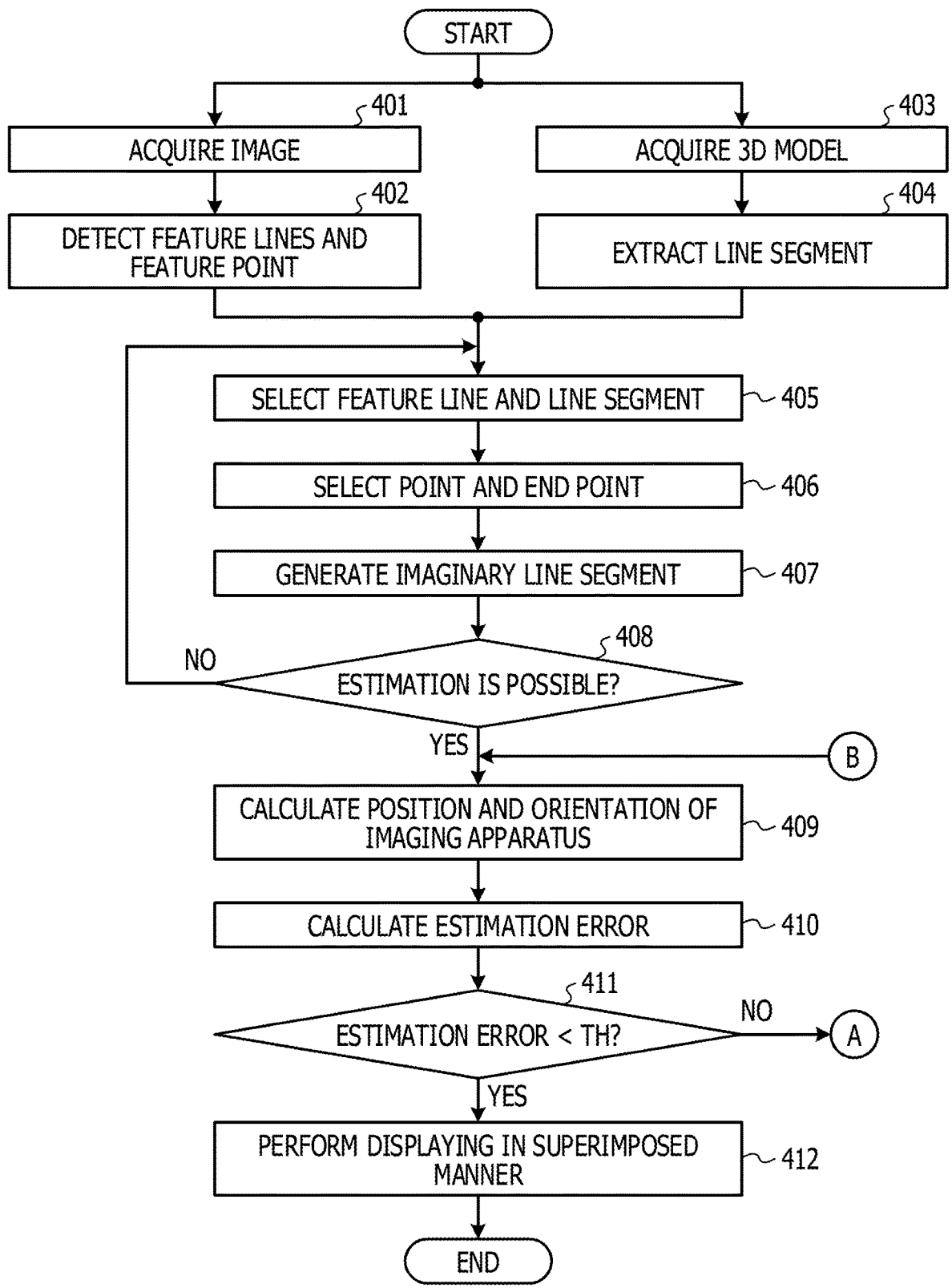
FIGS. 4A and 4B are a flowchart illustrating a specific example of the estimation processing.
Figure 4B:
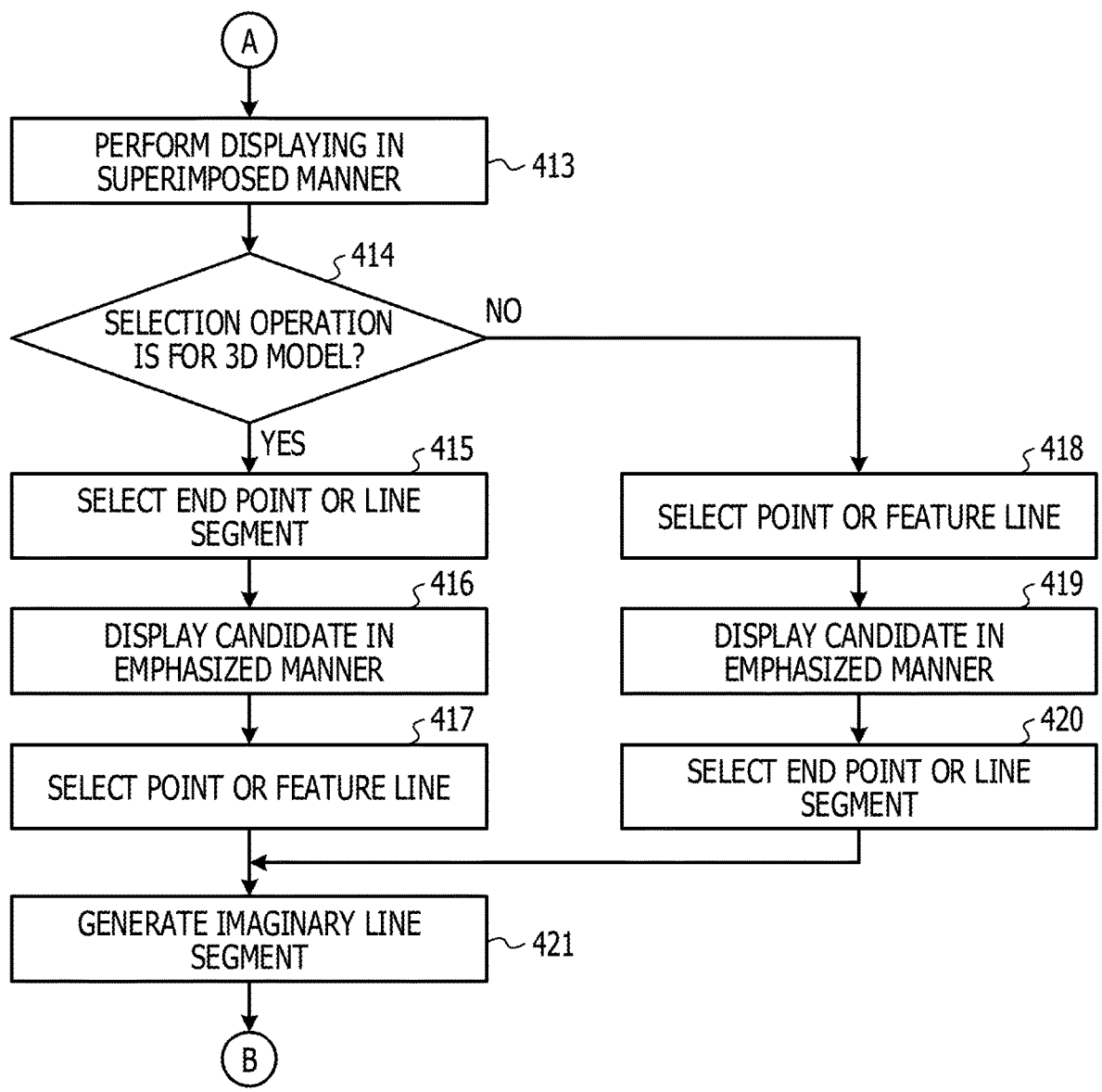

FIG. 4 (i.e. FIGS. 4A and 4B) is a flowchart illustrating a specific example of the estimation processing performed by the estimation apparatus 101 in FIG. 3. The image acquisition unit 311 acquires the image 351 from the imaging apparatus 301 (step 401), the feature line detection unit 321 detects the multiple feature lines 353 in the image 351, and the feature point detection unit 322 detects the multiple feature points 354 in the image 351 (step 402).

The extraction unit 312 acquires the 3D model 352 from the storage unit 111 (step 403) and extracts multiple line segments from the 3D model 352 (step 404). The display unit 313 displays on the screen the image 351, the multiple feature lines 353, the multiple feature points 354, and the multiple line segments indicating the 3D model 352.

A user selects the feature line 353 in the image 351 and a line segment in the 3D model 352, and the reception unit 113 receives an instruction for associating the selected feature line 353 with the selected line segment (step 405). The generation unit 114 generates the actual line segment corresponding pair 355 in which the feature line 353 is associated with the line segment.

The user then selects two or more points in the image 351 and two or more end points in the 3D model 352, and the reception unit 113 receives an instruction for associating the selected points with the respective selected end points (step 406). The generation unit 114 generates the imaginary line segment VL1 that connects the two points to each other and the imaginary line segment VL2 that connects the two end points to each other and then generates the imaginary line segment corresponding pair 356 in which the imaginary line segment VL1 is associated with the imaginary line segment VL2 (step 407).

The determination unit 342 determines whether it is possible to accurately estimate the position and orientation of the imaging apparatus 301 in accordance with the actual line segment corresponding pair 355 and the imaginary line segment corresponding pair 356 (step 408). In a case where it is not possible to accurately estimate the position and orientation of the imaging apparatus 301 (NO in step 408), the estimation apparatus 101 repeats processing from step 405. In this manner, a new corresponding pair is generated and added to the actual line segment corresponding pair 355 or the imaginary line segment corresponding pair 356.

Conversely, in a case where it is possible to accurately estimate the position and orientation of the imaging apparatus 301 (YES in step 408), the calculation unit 341 calculates the position and orientation of the imaging apparatus 301 by using the actual line segment corresponding pair 355 and the imaginary line segment corresponding pair 356 (step 409). In this manner, the estimation result 357 is generated.

Subsequently, the evaluation unit 343 calculates the estimation error of the position and orientation of the imaging apparatus 301 (step 410) and compares the estimation error with a predetermined threshold TH (step 411). In a case where the estimation error is equal to or more than the threshold TH (NO in step 411), the evaluation unit 343 instructs the display unit 313 to display information for requesting an additional instruction. The calculation unit 341 projects the 3D model 352 on the image 351 by using the position and orientation of the imaging apparatus 301 calculated in step 409 as a tentative position and orientation.

The display unit 313 then displays the 3D model 352 projected on the image 351 in a superimposed manner and the information for requesting an additional instruction on the screen (step 413). In this case, the user may select an additional end point or an additional line segment in the 3D model 352 and an additional point or an additional feature line in the image 351. The evaluation unit 343 determines whether the first selection operation is for the 3D model 352 or the image 351 (step 414).

In a case where the first selection operation is for the 3D model 352 (YES in step 414), the user selects an additional end point or an additional line segment, and the reception unit 113 receives information about the selected additional end point or the selected additional line segment (step 415). The calculation unit 341 searches for a candidate of an additional point or an additional feature line in the image 351 corresponding to the selected additional end point or the selected additional line segment and instructs the display unit 313 to display in an emphasized manner the candidate that has been found (step 416).

The display unit 313 displays in an emphasized manner the candidate of an additional point or an additional feature line in the image 351. For example, the display unit 313 displays the candidate in an emphasized manner by displaying in an enlarged manner the candidate of an additional point or an additional feature line, displaying in an enlarged manner an area including the candidate of an additional point or an additional feature line, or changing the color of the candidate of an additional point or an additional feature line.

The user selects the candidate of an additional point or an additional feature line displayed in an emphasized manner and inputs in the estimation apparatus 101 an instruction for associating the selected additional end point or the selected additional line segment with the selected additional point or the selected additional feature line (step 417). The reception unit 113 receives the instruction.

Conversely, in a case where the first selection operation is for the image 351 (NO in step 414), the user selects an additional point or an additional feature line, and the reception unit 113 receives information about the selected additional point or the selected additional feature line (step 418). The calculation unit 341 searches for a candidate of an additional end point or an additional line segment in the 3D model 352 corresponding to the selected additional point or the selected additional feature line and instructs the display unit 313 to display in an emphasized manner the candidate that has been found (step 419). The display unit 313 displays in an emphasized manner the candidate of an additional end point or an additional line segment in the 3D model 352.

The user selects the candidate of an additional end point or an additional line segment displayed in an emphasized manner and inputs in the estimation apparatus 101 an instruction for associating the selected additional point or the selected additional feature line with the selected additional end point or the selected additional line segment (step 420). The reception unit 113 receives the instruction.

The generation unit 114 generates the imaginary line segment VL3 that connects the point having been selected in the image 351 to the additional point newly selected and the imaginary line segment VL4 that connects the end point having been selected in the 3D model 352 to the additional end point newly selected (step 421). The generation unit 114 adds a corresponding pair in which the imaginary line segment VL3 is associated with the imaginary line segment VL4 to the imaginary line segment corresponding pair 356, and the estimation apparatus 101 performs processing from step 409. In this manner, the number of corresponding pairs included in the imaginary line segment corresponding pair 356 increases, and therefore, it is expected that the estimation error decreases in step 410.

In a case where the estimation error is smaller than the threshold TH (YES in step 411), the calculation unit 341 projects the 3D model 352 on the image 351 by using the calculated position and orientation of the imaging apparatus 301 (step 412). The display unit 313 displays the 3D model 352 on the image 351 in a superimposed manner.

In step 421, the generation unit 114 may generate a corresponding pair in which the imaginary line segment VL3 is associated with the additional line segment selected in the 3D model 352 or a corresponding pair in which the additional feature line selected in the image 351 is associated with the imaginary line segment VL4.

In the estimation processing in FIG. 4, upon generation of the actual line segment corresponding pair 355 and the imaginary line segment corresponding pair 356 with which it is possible to accurately estimate the position and orientation of the imaging apparatus 301, a tentative position and orientation is calculated. In a case where the estimation error of the tentative position and orientation is relatively large, a corresponding pair of the imaginary line segment VL3 and the imaginary line segment VL4 is added to the imaginary line segment corresponding pair 356 and another tentative position and orientation is calculated. In this manner, it is determined whether to request an additional instruction from the user in accordance with the desired accuracy of estimation.

When the selection operation targeting one of the operation targets of the 3D model 352 and the image 351 is performed to add a corresponding pair to the imaginary line segment corresponding pair 356, a candidate for selection included in the other of the operation targets is displayed in an emphasized manner. In this manner, many selectable objects included in the other of the operation targets narrow to selectable objects useful for adding an imaginary line segment and only the useful selectable objects are displayed, thereby facilitating the selection operation.

It is noted that, in step 411, instead of the evaluation unit 343 comparing the estimation error with the threshold TH, the user may visually evaluate the estimation error. In this case, the calculation unit 341 projects the 3D model 352 on the image 351 by using the tentative position and orientation of the imaging apparatus 301, and the display unit 313 displays the 3D model 352 projected on the image 351 in a superimposed manner.

In a case where the interval between the image 351 and the 3D model 352 is relatively large, the user determines that the estimation error is large. In a case where the interval between the image 351 and the 3D model 352 is relatively small, the user determines that the estimation error is small. In a case where it is determined that the estimation error is large, processing from step 413 is performed. In a case where it is determined that the estimation error is small, processing from step 412 is performed.

Figure 5B:
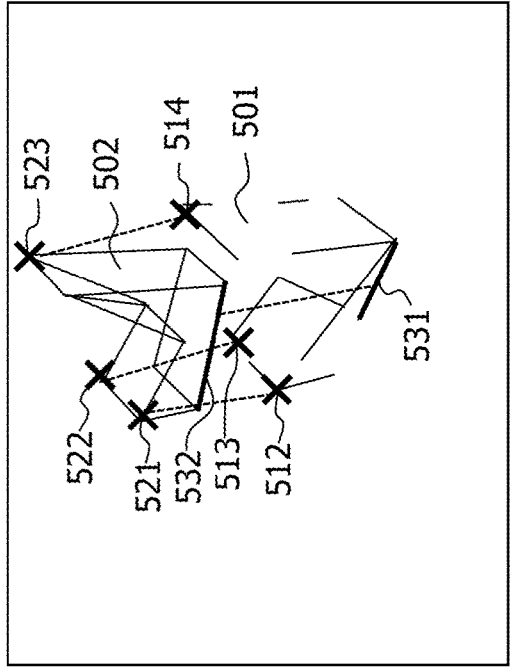
FIGS. 5A to 5D illustrate the estimation processing for an object of a polyhedron.
Figure 5D:
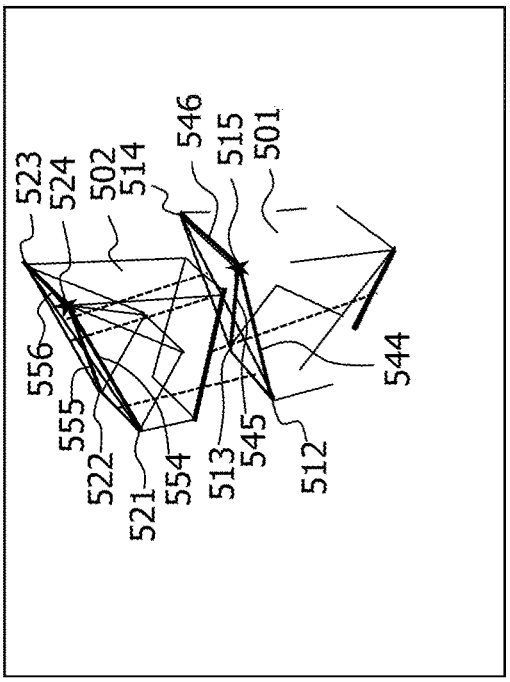
Figure 5A:
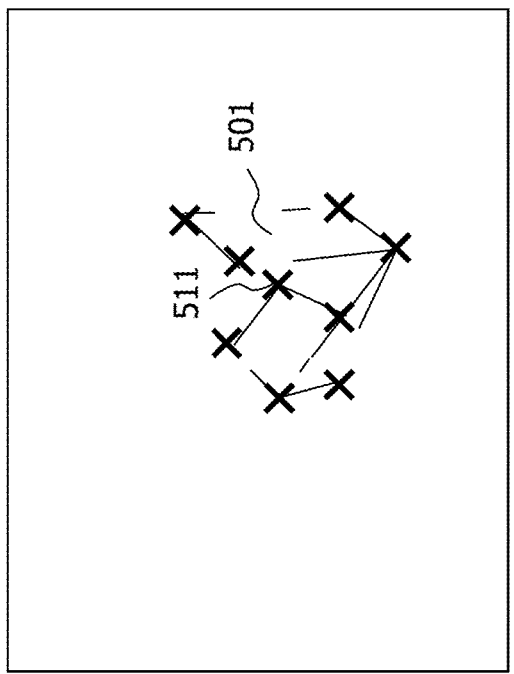

FIGS. 5A to 5D illustrate examples of the estimation processing for an object of a polyhedron. FIG. 5A illustrates an example of an image 501 of an object, and feature lines and feature points that are detected in the image 501. In FIG. 5A, a line segment represents a feature line and x represents a feature point. Among nine feature points in FIG. 5A, a feature point 511 is merely an end point of a feature line corresponding to an edge of the object, and thus a 3D model 502 of the object in FIG. 5B does not include an end point corresponding to the feature point 511.

FIG. 5B illustrates an example of the actual line segment corresponding pair 355, feature points selected in the image 501 by a user, and end points selected in the 3D model 502. In this example, by a user's instruction, a feature line 531 in the image 501 is associated with a line segment 532 in the 3D model 502 and the actual line segment corresponding pair 355 is generated. In addition, the selection operation without specifying an imaginary line segment is performed and a feature point 512, a feature point 513, and a feature point 514 in the image 501 are associated with an end point 521, an end point 522, and an end point 523 in the 3D model 502, respectively.

Figure 5C:
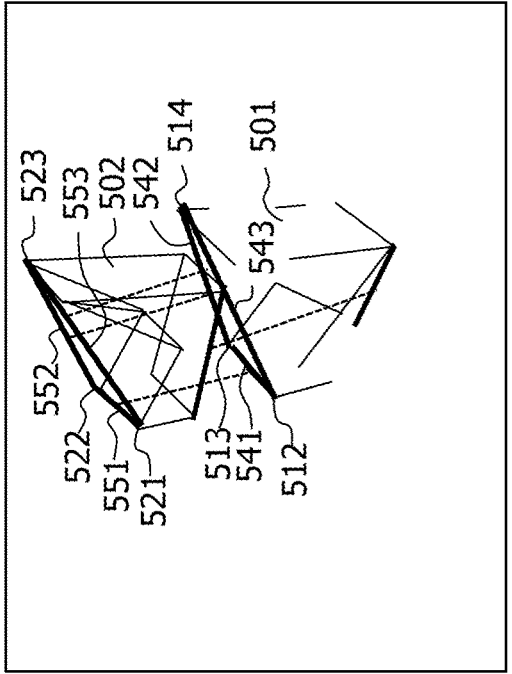

FIG. 5C illustrates an example of the imaginary line segment corresponding pair 356. In this example, six imaginary line segments are generated as follows.

An imaginary line segment 541: a line segment that connects the feature point 512 and the feature point 513
An imaginary line segment 542: a line segment that connects the feature point 513 and the feature point 514
An imaginary line segment 543: a line segment that connects the feature point 514 and the feature point 511
An imaginary line segment 551: a line segment that connects the end point 521 and the end point 522
An imaginary line segment 552: a line segment that connects the end point 522 and the end point 523
An imaginary line segment 553: a line segment that connects the end point 523 and the end point 521

From these six imaginary line segments, the following three corresponding pairs are generated as the imaginary line segment corresponding pairs 356.

A corresponding pair in which the imaginary line segment 541 is associated with the imaginary line segment 551
A corresponding pair in which the imaginary line segment 542 is associated with the imaginary line segment 552
A corresponding pair in which the imaginary line segment 543 is associated with the imaginary line segment 553

FIG. 5D illustrates an example of an additional feature point selected in the image 501 by the user and an additional end point selected in the 3D model 502. In this example, a feature point 515 in the image 501 is selected as an additional feature point and an end point 524 in the 3D model 502 is selected as an additional end point. In this case, the following six imaginary line segments are newly generated.

An imaginary line segment 544: a line segment that connects the feature point 515 and the feature point 512
An imaginary line segment 545: a line segment that connects the feature point 515 and the feature point 513
An imaginary line segment 546: a line segment that connects the feature point 515 and the feature point 514
An imaginary line segment 554: a line segment that connects the end point 524 and the end point 521
An imaginary line segment 555: a line segment that connects the end point 524 and the end point 522
An imaginary line segment 556: a line segment that connects the end point 524 and the end point 523

From these six imaginary line segments, the following three corresponding pairs are added to the imaginary line segment corresponding pair 356.

A corresponding pair in which the imaginary line segment 544 is associated with the imaginary line segment 554
A corresponding pair in which the imaginary line segment 545 is associated with the imaginary line segment 555
A corresponding pair in which the imaginary line segment 546 is associated with the imaginary line segment 556

Figure 6A:
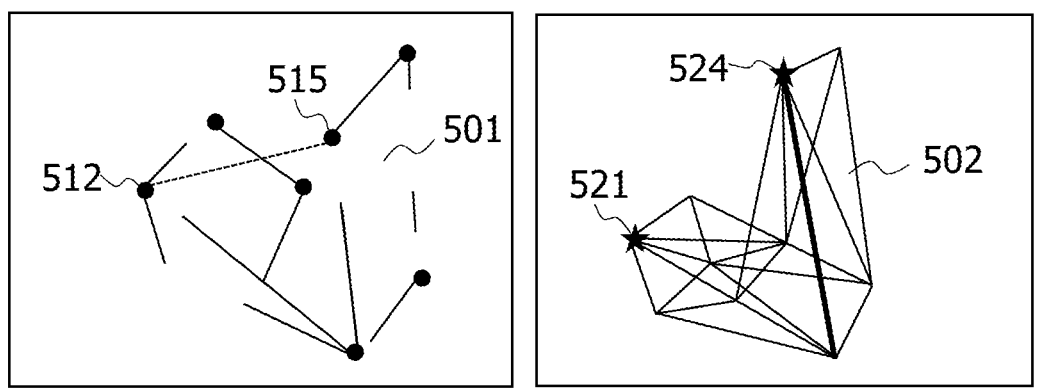
FIGS. 6A and 6B illustrate a selection operation with specifying an imaginary line segment.
Figure 6B:
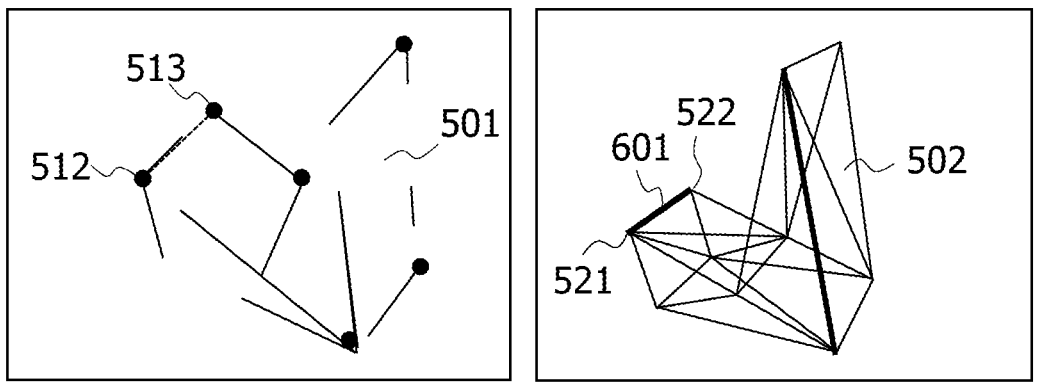

FIGS. 6A and 6B illustrate examples of the selection operation with specifying an imaginary line segment. FIG. 6A illustrates an example of the selection operation for selecting a feature point in the image 501 and an end point in the 3D model 502. In FIG. 6A, a line segment in the image 501 represents a feature line and a black circle represents a feature point. The user selects the feature point 512 and the feature point 515 in the image 501 and the end point 521 and the end point 524 in the 3D model 502. In this manner, the generation unit 114 generates the imaginary line segment 544 that connects the feature point 512 and the feature point 515 and the imaginary line segment 554 that connects the end point 521 and the end point 524 and accordingly generates a corresponding pair in which the imaginary line segment 544 is associated with the imaginary line segment 554.

FIG. 6B illustrates an example of the selection operation for selecting a feature point in the image 501 and a line segment in the 3D model 502. The user selects the feature point 512 and the feature point 513 in the image 501 and a line segment 601 in the 3D model 502, thereby designating the end point 521 and the end point 522 of the line segment 601. Subsequently, the generation unit 114 generates the imaginary line segment 541 that connects the feature point 512 and the feature point 513 and the imaginary line segment 551 that connects the end point 521 and the end point 522 and accordingly generates a corresponding pair in which the imaginary line segment 541 is associated with the imaginary line segment 551. In this case, because the generated imaginary line segment 551 coincides with the line segment 601, the user may directly select the line segment 601.

Figure 7A:
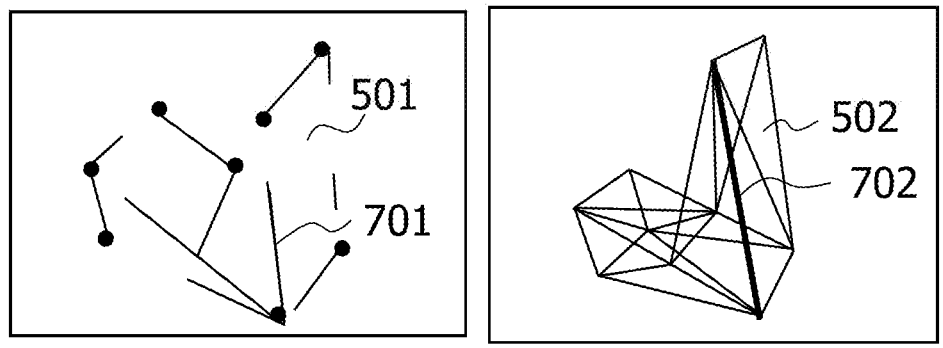
FIGS. 7A to 7C illustrate a selection operation for selecting an actual line segment corresponding pair and a selection operation without specifying an imaginary line segment.
Figure 7B:
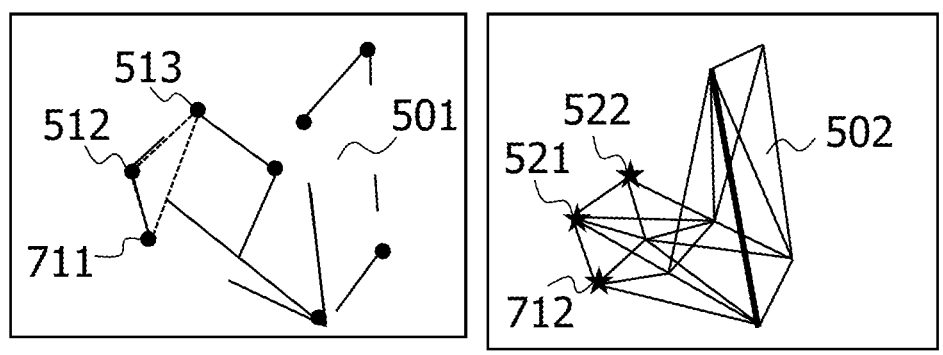
Figure 7C:
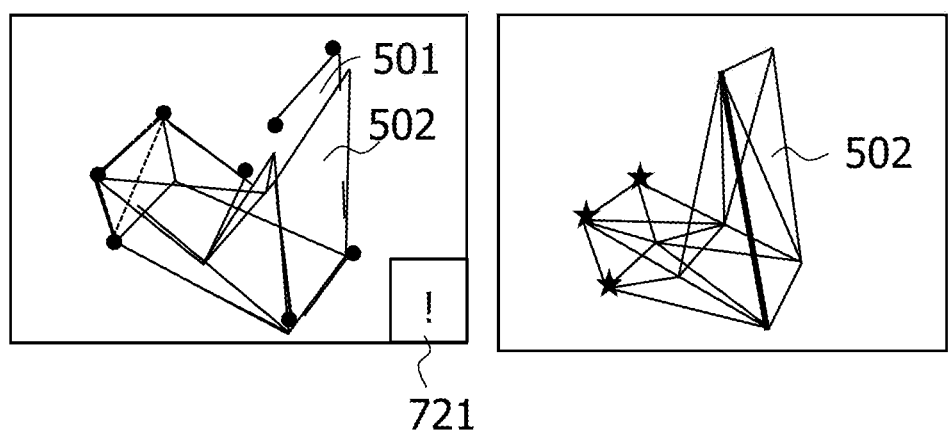

FIGS. 7A to 7C illustrate examples of the selection operation for selecting the actual line segment corresponding pair 355 and the selection operation without specifying an imaginary line segment. FIG. 7A illustrates an example of the selection operation for selecting the actual line segment corresponding pair 355. In FIG. 7A, a line segment in the image 501 represents a feature line and a black circle represents a feature point. The user selects a feature line 701 in the image 501 and a line segment 702 in the 3D model 502, and the generation unit 114 generates the actual line segment corresponding pair 355 by associating the feature line 701 with the line segment 702.

FIG. 7B illustrates an example of the selection operation without specifying an imaginary line segment. The user selects the feature point 512, the feature point 513, and the feature point 711 in the image 351, and the generation unit 114 generates three kinds of combinations of respective two feature points among the three selected feature points and accordingly generates imaginary line segments that each connect two feature points included in the respective combinations.

The user selects the end point 521, the end point 522, and an end point 712 in the 3D model 502 as end points corresponding to the feature point 512, the feature point 513, and the feature point 711, respectively. The generation unit 114 generates three kinds of combinations of respective two end points among the three selected end points and accordingly generates an imaginary line segments that each connect two end points included in the respective combinations. In this manner, the following six imaginary line segments are generated.

An imaginary line segment that connects the feature point 512 and the feature point 513
An imaginary line segment that connects the feature point 513 and the feature point 711
An imaginary line segment that connects the feature point 711 and the feature point 512
An imaginary line segment that connects the end point 521 and the end point 522
An imaginary line segment that connects the end point 522 and the end point 712
An imaginary line segment that connects the end point 712 and the end point 521

From these six imaginary line segments, three corresponding pairs are generated as the imaginary line segment corresponding pair 356.

FIG. 7C illustrates an example of displaying in a superimposed manner in accordance with the tentative position and orientation of the imaging apparatus 301. The calculation unit 341 calculates the tentative position and orientation by using the actual line segment corresponding pair 355 generated by the selection operation illustrated in FIG. 7A and the imaginary line segment corresponding pair 356 generated by the selection operation illustrated in FIG. 7B. The display unit 313 displays in a superimposed manner the image 501 and the 3D model 502 projected on the image 501 by using the tentative position and orientation. In this example, since the estimation error is equal to or more than the threshold TH, the display unit 313 displays on the screen a mark 721 as the information for requesting an additional instruction.

Figure 8A:
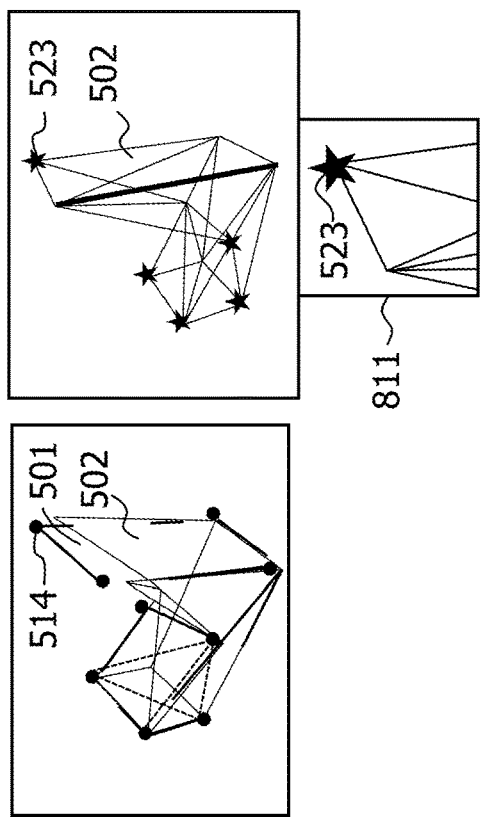
FIGS. 8A to 8D illustrate a selection operation for adding a corresponding pair to an imaginary line segment corresponding pair.

FIGS. 8A to 8D illustrate examples of the selection operation for adding a corresponding pair to the imaginary line segment corresponding pair 356 in displaying in a superimposed manner illustrated in FIG. 7C. FIG. 8A illustrates an example of the selection operation for the 3D model 502 in order to add a corresponding pair. The user firstly selects an end point 801 in the 3D model 502 as an additional end point, and the calculation unit 341 searches for a candidate 802 of an additional point in the image 501 corresponding to the selected end point 801. The display unit 313 displays in a window 804 an area 803 containing the candidate 802 of an additional point in an enlarged manner. In this manner, the candidate 802 of an additional point is displayed in an emphasized manner.

Figure 8B:
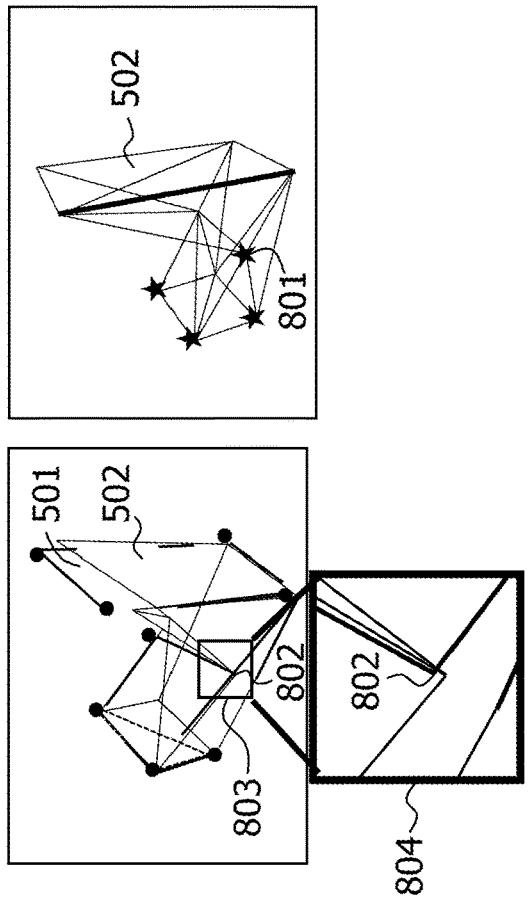

FIG. 8B illustrates an example of the selection operation for the image 501 in order to add another corresponding pair after the candidate 802 of an additional point has been selected and a corresponding pair in which the end point 801 is associated with the candidate 802 of an additional point has been added. The user firstly selects the feature point 514 in the image 501 as an additional feature point, and the calculation unit 341 searches for a candidate 523 of an additional end point in the 3D model 502 corresponding to the selected feature point 514. The display unit 313 displays in a window 811 an area containing the candidate 523 of an additional end point in an enlarged manner. In this manner, the candidate 523 of an additional end point is displayed in an emphasized manner.

Figure 8C:
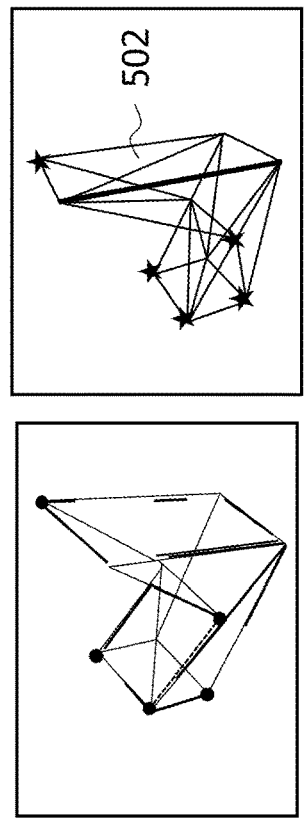

FIG. 8C illustrates an example of a state in which the candidate 523 of an additional end point is selected and a corresponding pair in which the feature point 514 is associated with the candidate 523 of an additional end point is added. In this state, the actual line segment corresponding pair 355 is a corresponding pair in which the feature line 701 is associated with the line segment 702. The imaginary line segment corresponding pair 356 includes ten corresponding pairs generated from five points including the feature points 512 to 514, and 711, and a point 802, and five end points including the end points 521 to 523, and 712, and the end point 801.

Figure 8D:
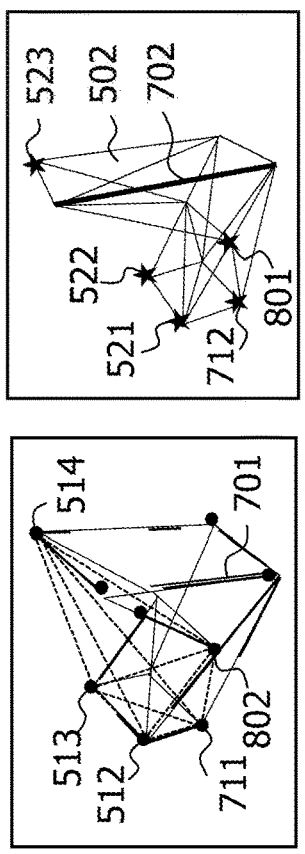

FIG. 8D illustrates an example of displaying in a superimposed manner in accordance with a final position and orientation of the imaging apparatus 301. The calculation unit 341 calculates the position and orientation of the imaging apparatus 301 by using the actual line segment corresponding pair 355 and the imaginary line segment corresponding pair 356 in the state in FIG. 8C, and the display unit 313 displays the image 501 and the 3D model 502 in a superimposed manner. In this example, since the estimation error is smaller than the threshold TH, the display unit 313 does not display the mark 721.

In step 402 in FIG. 4, the display unit 313 may display on the screen only the feature point 354 useful as a selectable object among the multiple feature points 354. In this case, the feature point detection unit 322 specifies the feature point 354 within a predetermined region around an intersection point of the multiple feature lines 353 among the multiple feature points 354 detected in the image 351, and the display unit 313 displays only the feature point 354 specified by the feature point detection unit 322.

Figure 9:
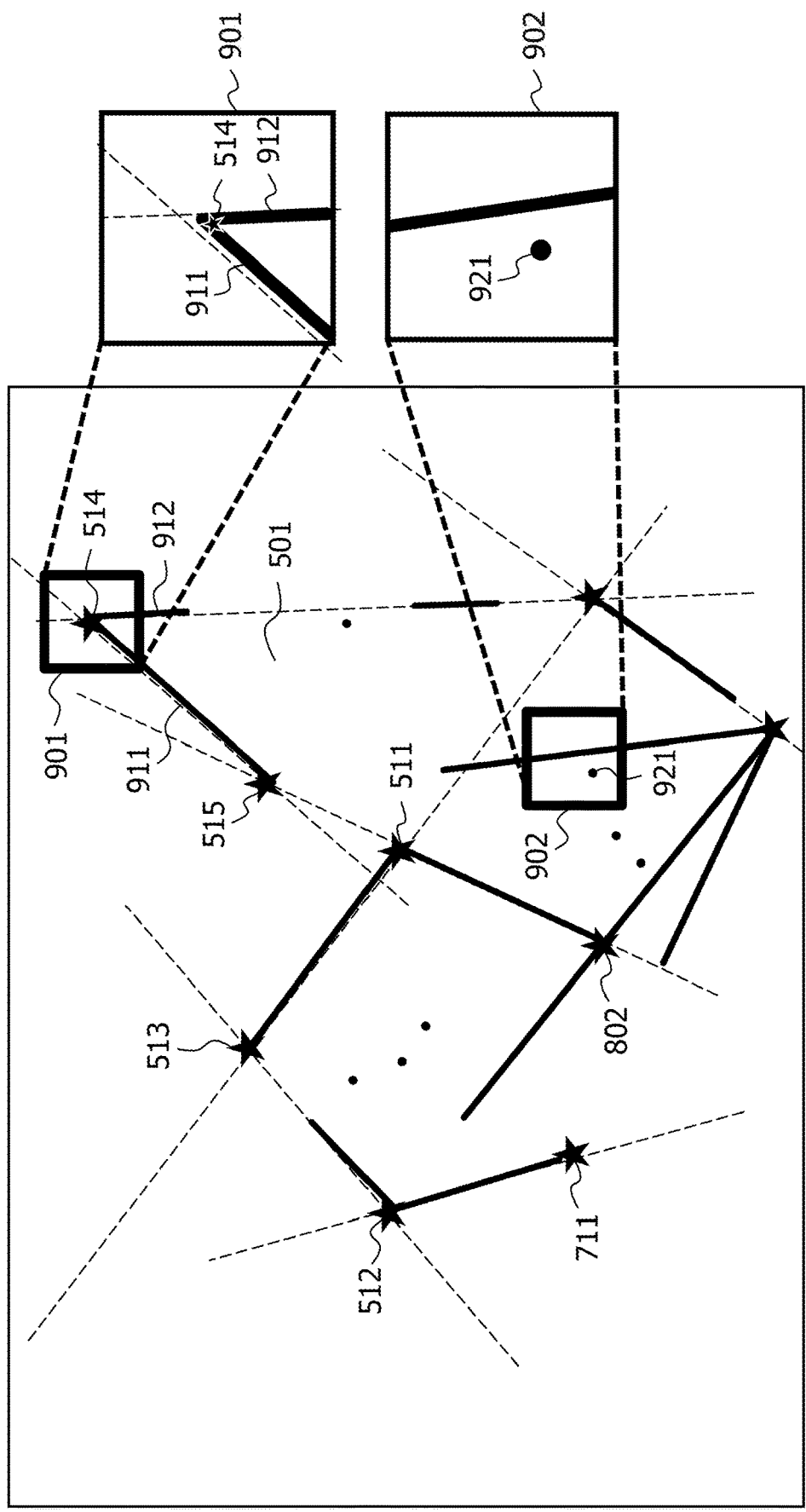
FIG. 9 illustrates a feature point within a predetermined region.

FIG. 9 illustrates an example of the feature point 354 within a predetermined region around an intersection point of the feature lines 353. An area 901 of the image 501 corresponds to a predetermined region (an neighborhood area) around an intersection point of a feature line 911 and a feature line 912 that are detected in the image 501 and includes the feature point 514 detected in the image 501. In this case, the display unit 313 displays only the feature point 514 in the area 901 as a selectable object corresponding to the intersection point of the feature line 911 and the feature line 912.

Similarly, the display unit 313 displays only a feature point within an neighborhood area around an intersection point as a selectable object corresponding to the intersection point of other feature lines detected in the image 501. In this manner, a feature point detected in accordance with a pattern or shade on a surface of an object, which is similar to a feature point 921 in an area 902, is excluded from selectable objects. This decreases the number of feature points as selectable objects, thereby decreasing the operation load.

In step 410 in FIG. 4, the evaluation unit 343 is able to calculate the estimation error by employing the calculation method described in patent literature 3. In this case, the evaluation unit 343 calculates an error Ei (i=1 to N) between a position of the feature line 353 and a position of a line segment that are included in one of the corresponding pairs by using N corresponding pairs (N is an integer equal to or more than 2) of the actual line segment corresponding pair 355 and the imaginary line segment corresponding pair 356. The evaluation unit 343 calculates a sum E of squared errors for the N corresponding pairs as the estimation error. The sum E of squared errors are calculated by the following equation.

$$E = \sum_{i=1}^{N} (Ei)^2 \quad (1)$$

Figure 10:
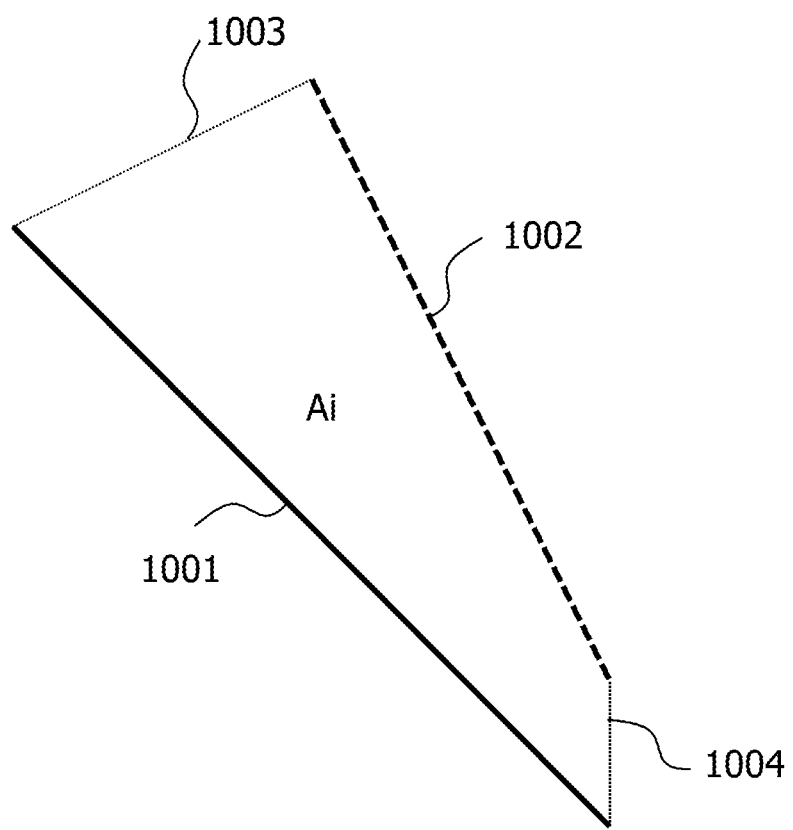
FIG. 10 illustrates a calculation method in accordance with an area.
Figure 11:
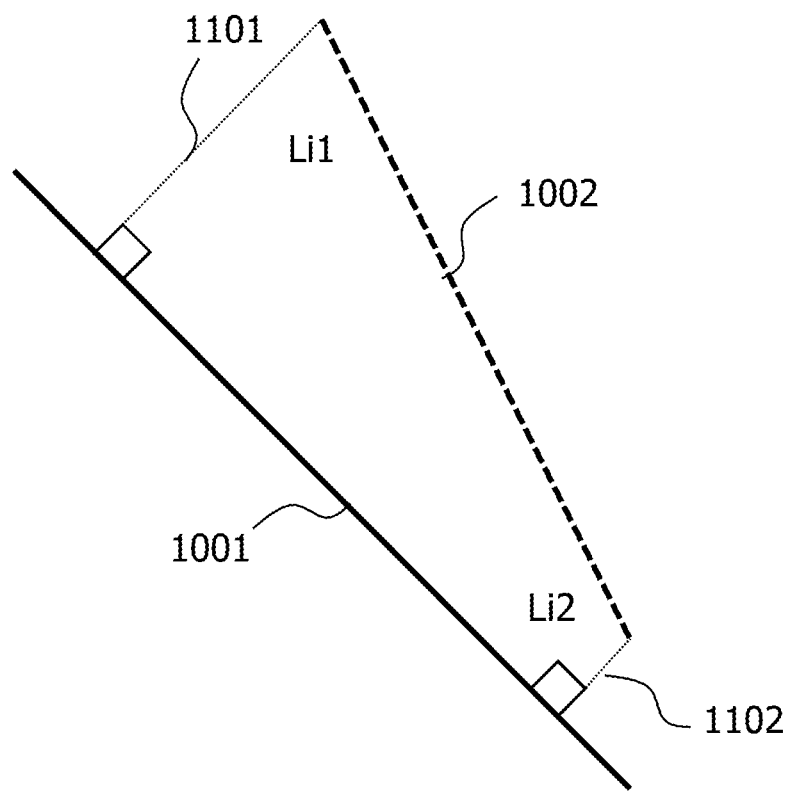
FIG. 11 illustrates a calculation method in accordance with a distance.

The evaluation unit 343 is capable of calculating the error Ei by employing, for example, a method illustrated in FIG. 10 or a method illustrated in FIG. 11. FIG. 10 illustrates an example of a calculation method in accordance with the area between a feature line and a line segment. In a case where a line segment included in an ith corresponding pair is a line segment 1001 and a feature line included in the ith corresponding pair is a line segment 1002, a line segment 1003 and a line segment 1004 that each connect one of two ends of the line segment 1001 and one of two ends of the line segment 1002 are determined. In this case, an area Ai surrounded by the line segments 1001 to 1004 is used as the error Ei.

$$Ei = Ai \quad (2)$$

As the area Ai decreases, the error Ei decreases, and when the line segment 1001 completely overlaps with the line segment 1002, the error Ei is 0.

FIG. 11 illustrates an example of a calculation method in accordance with a distance between a feature line and a line segment. It is assumed that the length of a perpendicular 1101 and the length of a perpendicular 1102, each perpendicular connecting one of two ends of the line segment 1002 to the line segment 1001, are Li1 and Li2, respectively. In this case, the sum of the Li1 and the Li2 is used as the error Ei.

$$Ei = Li1 + Li2 \quad (3)$$

As the Li1 and the Li2 decreases, the error Ei decreases, and when the line segment 1001 completely overlaps with the line segment 1002, the error Ei is 0.

The configuration of the estimation apparatus 101 illustrated in FIGS. 1 and 3 is merely an example, and some components may be omitted or changed in accordance with the usage or the condition of the estimation apparatus 101. For example, in a case where an external device performs processing for extracting a line segment from the 3D model 352, the estimation apparatus 10 in FIG. 3 may omits the extraction unit 312. In a case where an external device performs processing for displaying the image 351 and the 3D model 352, the display unit 313 may be omitted.

In a case where the user visually selects a point in the image 351 and it is not desired to display the feature point 354 as a selectable object, the feature point detection unit 322 may be omitted. Instead of CAD data, other shape information indicating the shape of an object may be used as the 3D model 352.

The flowcharts illustrated in FIGS. 2 and 4 are merely examples, and part of processing may be omitted or changed in accordance with the configuration or the condition of the estimation apparatus 101. For example, in the estimation processing illustrated in FIG. 4, in a case where it is not desired to display the feature point 354 as a selectable object, only the feature line 353 is detected in step 402. In a case where it is not desired to display a candidate for selection in an emphasized manner, processing in steps 416 and 419 may be omitted.

The image 501, the 3D model 502, the feature lines, the feature points, the line segments, the end points, and the like illustrated in FIGS. 5 to 9 are merely examples, and the image, the 3D model, the feature line, the feature point, the line segment, the end point, and the like vary in accordance with an object targeted for image capturing.

The error calculation methods illustrated in FIGS. 10 and 11 are merely examples, and another calculation method may be applied in accordance with the configuration or the condition of the estimation apparatus 101. Equations (1) to (3) are merely examples, and other equations may be applied in accordance with the configuration or the condition of the estimation apparatus 101.

Figure 12:
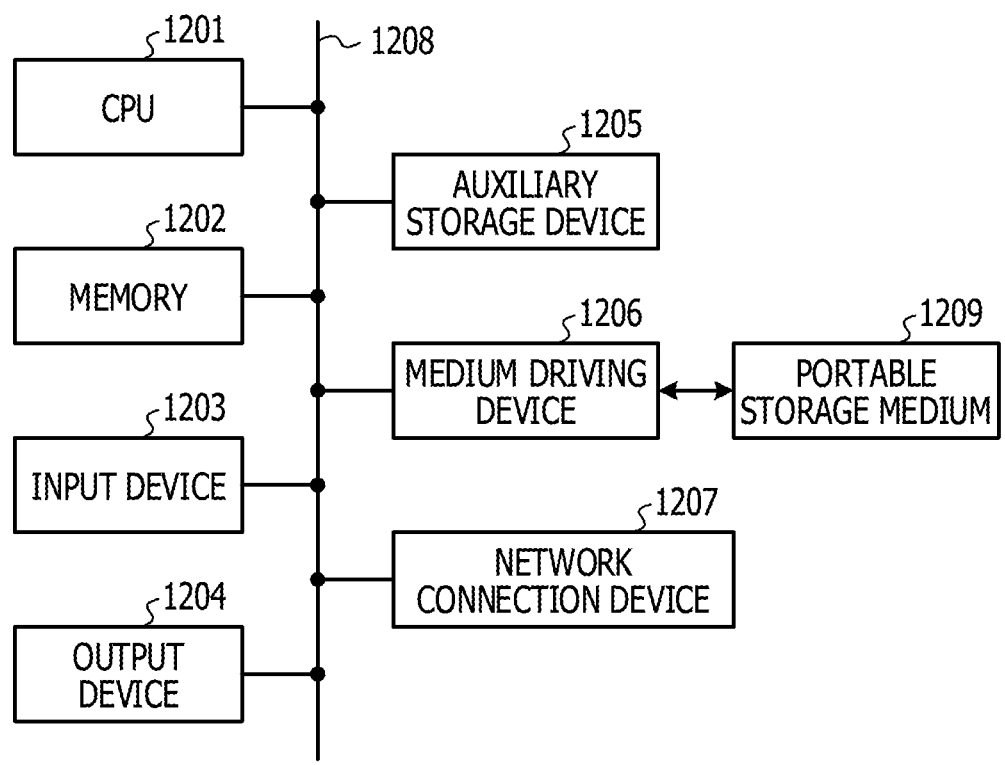
FIG. 12 illustrates a configuration of an information processing apparatus.

The estimation apparatus 101 in FIGS. 1 and 3 may be implemented by using, for example, an information processing apparatus (a computer) illustrated in FIG. 12. The information processing apparatus in FIG. 12 includes a central processing unit (CPU) 1201, a memory 1202, an input device 1203, an output device 1204, an auxiliary storage device 1205, a medium driving device 1206, and a network connection device 1207. A bus 1208 couples these components to each other. The bus 1208 may be couple to the imaging apparatus 301 in FIG. 3.

The memory 1202 is, for example, a semiconductor memory, such as a read only memory (ROM), a random access memory (RAM), or a flash memory, and stores a program and data that are used for processing. The memory 1202 may be used as the storage unit 111 in FIGS. 1 and 3.

The CPU 1201 (a processor) operates as the detection unit 112, the reception unit 113, the generation unit 114, and the estimation unit 115 in FIGS. 1 and 3 by, for example, executing a program by using the memory 1202. The CPU 1201 also operates as the image acquisition unit 311, the extraction unit 312, the feature line detection unit 321, the feature point detection unit 322, the calculation unit 341, the determination unit 342, and the evaluation unit 343 in FIG. 3 by executing a program by using the memory 1202.

The input device 1203 is, for example, a keyboard, and/or a pointing device, and used by an operator or a user for inputting an instruction or information. The output device 1204 is, for example, a display device, a printer, and/or a speaker, and used for outputting an inquiry or an instruction for an operator or a user, and a processing result. The processing result may be the estimation result 357 or the 3D model 352 superimposed onto the image 351. The output device 1204 may be used as the display unit 313 in FIG. 3.

The auxiliary storage device 1205 is, for example, a magnetic disk drive, an optical disk drive, a magneto-optical disk drive, or a tape drive. The auxiliary storage device 1205 may be a hard disk drive or a flash memory. The information processing apparatus stores a program and data in the auxiliary storage device 1205 and uses the program and the data by loading them in the memory 1202. The auxiliary storage device 1205 may be used as the storage unit 111 in FIGS. 1 and 3.

The medium driving device 1206 drives a portable storage medium 1209 and accesses the recorded content in the portable storage medium 1209. The portable storage medium 1209 is, for example, a memory device, a flexible disk, an optical disk, or a magneto-optical disk. The portable storage medium 1209 may be, for example, a compact disk read only memory (CD-ROM), a digital versatile disk (DVD), a universal serial bus (USB) memory. An operator or a user stores a program and data in the portable storage medium 1209 and uses the program and the data by loading them in the memory 1202.

As described above, a computer-readable storage medium storing a program and data used for processing is a physical (non-transitory) storage medium such as the memory 1202, the auxiliary storage device 1205, or the portable storage medium 1209.

The network connection device 1207 is a communication interface circuit that is connected to a communication network, such as a local area network or a wide area network, and that performs data conversion for communication. The information processing apparatus receives a program and data from an external device via the network connection device 1207 and uses the program and the data by loading them in the memory 1202.

It is noted that the information processing apparatus may not include all components in FIG. 12, and some components may be omitted in accordance with the usage and the condition. For example, in a case where the portable storage medium 1209 or a communication network is not used, the medium driving device 1206 or the network connection device 1207 may be omitted.

The embodiment of the disclosure and its advantages have been described in detail. It is expected that various modifications, additions, and omissions may be made by those skilled in the art without departing from the scope of the embodiment clearly described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An estimation apparatus comprising:
   a memory configured to store shape information containing information defining multiple line segments, each line segment of the multiple line segments depicting at least a part of a shape of an object; and
   a processor coupled to the memory and configured to
      execute detection processing that includes detecting multiple feature lines in an image of the object captured by an imaging apparatus,
      execute reception processing that includes
         receiving a first instruction from an input device in accordance with a first operation manipulated by a user, the first instruction being a signal representing the first operation manipulated by the user, the first operation being an operation for associating a feature line selected by the user from the multiple feature lines with a line segment selected by the user from the multiple line segments, and
         receiving a second instruction from the input device in accordance with a second operation manipulated by the user, the second instruction being a signal representing the second operation manipulated by the user, the second operation being an operation for associating two points selected by the user from the image with two end points selected by the user from end points of the multiple line segments,
      execute generation processing after the receiving of the second instruction, the generation processing including
         displaying a first virtual line segment by generating the first virtual line segment in the image in accordance with the second instruction, the first virtual line segment being a line segment connecting the two points selected by the user from the image and having not been defined in the shape information and having not been included in the multiple feature lines detected by the executing of the detection processing, and
         displaying a second virtual line segment by generating the second virtual line segment in the shape information in accordance with the second instruction, the second virtual line segment being a line segment connecting the two end points selected by the user, and
      execute estimation processing that includes estimating a position and orientation of the imaging apparatus in three-dimensional space by using a displayed first combination and a displayed second combination, the displayed first combination being a combination of the selected feature line and the selected line segment, the displayed second combination being a combination of the generated first virtual line segment and the generated second virtual line segment.

2. The estimation apparatus according to claim 1,
   wherein the second instruction associates three or more points including the two points with three or more end points including the two end points,
   wherein the generation processing is configured to
      generate multiple line segments including the first line segment by using the three or more points, and
      generate multiple line segments including the second line segment by using the three or more end points, and
   wherein the estimation processing is configured to estimate the position and orientation of the imaging apparatus by using the combination of the selected feature line and the selected line segment and combinations of the respective multiple line segments including the first line segment and the respective multiple line segments including the second line segment.

3. The estimation apparatus according to claim 1,
   wherein an estimation processing is configured to
      calculate an estimation error of the position and orientation of the imaging apparatus, and
      output information for requesting an additional instruction in accordance with the estimation error,
   wherein the reception processing is configured to receive a third instruction for associating an additional point with an additional end point,
   wherein the generation processing is configured to
      generate a first additional line segment by using the additional point and one of the two points, and
      generate a second additional line segment by using the additional end point and one of the two end points, and wherein the estimation processing is configured to estimate again the position and orientation of the imaging apparatus by using the combination of the selected feature line and the selected line segment, the combination of the first line segment and the second line segment, and a combination of the first additional line segment and the second additional line segment.

4. The estimation apparatus according to claim 3,
wherein the estimation processing is configured to, in a case where the additional end point is selected from the end points of the multiple line segments before the additional point is selected in the image, control displaying in a emphasized manner a candidate of a point in the image corresponding to the additional end point, and
wherein the reception processing is configured to receive an instruction for selecting the candidate of the point as the additional point.

5. The estimation apparatus according to claim 3,
wherein the estimation processing is configured to, in a case where the additional point is selected in the image before the additional end point is selected from the end points of the multiple line segments, control displaying in an emphasized manner a candidate of an end point corresponding to the additional point, and
wherein the reception processing is configured to receive an instruction for selecting the candidate of the end point as the additional end point.

6. An estimation method comprising:
obtaining shape information containing information defining multiple line segments, each line segment of the multiple line segments depicting at least a part of a shape of an object;
executing detection processing that includes detecting multiple feature lines in an image of the object captured by an imaging apparatus;
executing reception processing that includes
receiving a first instruction from an input device in accordance with a first operation manipulated by a user, the first instruction being a signal representing the first operation manipulated by the user, the first operation being an operation for associating a feature line selected by the user from the multiple feature lines with a line segment selected by the user from the multiple line segments, and
receiving a second instruction from the input device in accordance with a second operation manipulated by the user, the second instruction being a signal representing the second operation manipulated by the user, the second operation being an operation for associating two points selected by the user from the image with two end points selected by the user from end points of the multiple line segments;
executing generation processing after the receiving of the second instruction, the generation processing including
displaying a first virtual line segment by generating the first virtual line segment in the image in accordance with the second instruction, the first line virtual segment being a line segment connecting the two points selected by the user from the image and having not been defined in the shape information and having not been included in the multiple feature lines detected by the executing of the detection processing, and
displaying a second virtual line segment by generating the second virtual line segment in the shape information in accordance with the second instruction, the second virtual line segment being a line segment connecting the two end points selected by the user; and
executing estimation processing that includes estimating a position and orientation of the imaging apparatus in three-dimensional space by using a displayed first combination and a displayed second combination, the displayed first combination being a combination of the selected feature line and the selected line segment, the displayed second combination being a combination of the generated first virtual line segment and the generated second virtual line segment.

7. The estimation method according to claim 6,
wherein the second instruction associates three or more points including the two points with three or more end points including the two end points,
wherein the generation processing is configured to
generate multiple line segments including the first line segment by using the three or more points, and
generate multiple line segments including the second line segment by using the three or more end points, and
wherein the estimation processing is configured to estimate the position and orientation of the imaging apparatus by using the combination of the selected feature line and the selected line segment and combinations of the respective multiple line segments including the first line segment and the respective multiple line segments including the second line segment.

8. The estimation method according to claim 6,
wherein an estimation processing is configured to
calculate an estimation error of the position and orientation of the imaging apparatus, and
output information for requesting an additional instruction in accordance with the estimation error,
wherein the reception processing is configured to receive a third instruction for associating an additional point with an additional end point,
wherein the generation processing is configured to
generate a first additional line segment by using the additional point and one of the two points, and
generate a second additional line segment by using the additional end point and one of the two end points, and
wherein the estimation processing is configured to estimate again the position and orientation of the imaging apparatus by using the combination of the selected feature line and the selected line segment, the combination of the first line segment and the second line segment, and a combination of the first additional line segment and the second additional line segment.

9. The estimation method according to claim 8,
wherein the estimation processing is configured to, in a case where the additional end point is selected from the end points of the multiple line segments before the additional point is selected in the image, control displaying in a emphasized manner a candidate of a point in the image corresponding to the additional end point, and
wherein the reception processing is configured to receive an instruction for selecting the candidate of the point as the additional point.

10. The estimation method according to claim 8,
wherein the estimation processing is configured to, in a case where the additional point is selected in the image before the additional end point is selected from the end points of the multiple line segments, control displaying in an emphasized manner a candidate of an end point corresponding to the additional point, and wherein the reception processing is configured to receive an instruction for selecting the candidate of the end point as the additional end point.

11. A non-transitory computer-readable storage medium for storing an estimation program which causes a processor to perform processing, the processing comprising:

obtaining shape information containing information defining multiple line segments, each line segment of the multiple line segments depicting at least a part of a shape of an object;

executing detection processing that includes detecting multiple feature lines in an image of the object captured by an imaging apparatus;

executing reception processing that includes receiving a first instruction from an input device in accordance with a first operation manipulated by a user, the first instruction being a signal representing the first operation manipulated by the user, the first operation being an operation for associating a feature line selected by the user from the multiple feature lines with a line segment selected by the user from the multiple line segments, and receiving a second instruction from the input device in accordance with a second operation manipulated by the user, the second instruction being a signal representing the second operation manipulated by the user, the second operation being an operation for associating two points selected by the user from the image with two end points selected by the user from end points of the multiple line segments;

executing generation processing after the receiving of the second instruction, the generation processing including displaying a first virtual line segment by generating the first virtual line segment in the image in accordance with the second instruction, the first virtual line segment being a line segment connecting the two points selected by the user from the image and having not been defined in the shape information and having not been included in the multiple feature lines detected by the executing of the detection processing, and displaying a second virtual line segment by generating the second virtual line segment in the shape information in accordance with the second instruction, the second virtual line segment being a line segment connecting the two end points selected by the user; and executing estimation processing that includes estimating a position and orientation of the imaging apparatus in three-dimensional space by using a displayed first combination and a displayed second combination, the displayed first combination being a combination of the selected feature line and the selected line segment, the displayed second combination being a combination of the generated first virtual line segment and the generated second virtual line segment.

12. The non-transitory computer-readable storage medium according to claim 11, wherein the second instruction associates three or more points including the two points with three or more end points including the two end points, wherein the generation processing is configured to generate multiple line segments including the first line segment by using the three or more points, and generate multiple line segments including the second line segment by using the three or more end points, and wherein the estimation processing is configured to estimate the position and orientation of the imaging apparatus by using the combination of the selected feature line and the selected line segment and combinations of the respective multiple line segments including the first line segment and the respective multiple line segments including the second line segment.

13. The non-transitory computer-readable storage medium according to claim 11, wherein an estimation processing is configured to calculate an estimation error of the position and orientation of the imaging apparatus, and output information for requesting an additional instruction in accordance with the estimation error, wherein the reception processing is configured to receive a third instruction for associating an additional point with an additional end point, wherein the generation processing is configured to generate a first additional line segment by using the additional point and one of the two points, and generate a second additional line segment by using the additional end point and one of the two end points, and wherein the estimation processing is configured to estimate again the position and orientation of the imaging apparatus by using the combination of the selected feature line and the selected line segment, the combination of the first line segment and the second line segment, and a combination of the first additional line segment and the second additional line segment.

14. The non-transitory computer-readable storage medium according to claim 13, wherein the estimation processing is configured to, in a case where the additional end point is selected from the end points of the multiple line segments before the additional point is selected in the image, control displaying in a emphasized manner a candidate of a point in the image corresponding to the additional end point, and wherein the reception processing is configured to receive an instruction for selecting the candidate of the point as the additional point.

15. The non-transitory computer-readable storage medium according to claim 13, wherein the estimation processing is configured to, in a case where the additional point is selected in the image before the additional end point is selected from the end points of the multiple line segments, control displaying in an emphasized manner a candidate of an end point corresponding to the additional point, and wherein the reception processing is configured to receive an instruction for selecting the candidate of the end point as the additional end point.

* * * * *